March 30, 1926.

J. W. YATES

DRY PIPE VALVE

Filed Sept. 21, 1922

Witnesses:

Inventor.
John W. Yates
By his Atty,

March 30, 1926.　　　　　　　　　　　　　　1,579,189
J. W. YATES
DRY PIPE VALVE
Filed Sept. 21, 1922　　　2 Sheets-Sheet 2
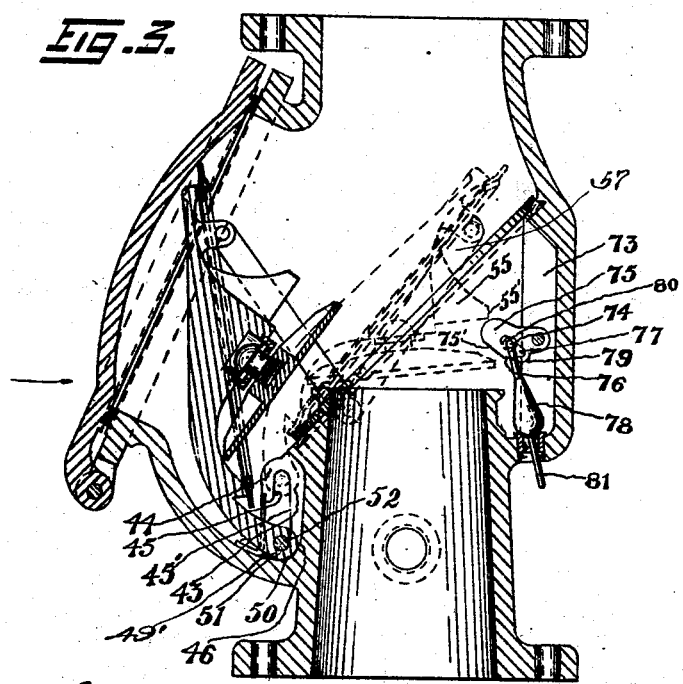
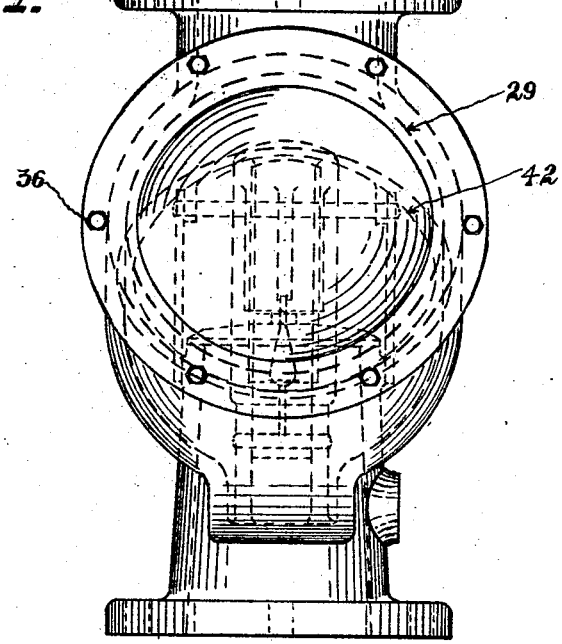
Witnesses:　　　　　　　　　　　　　　Inventor:
　　　　　　　　　　　　　　　　　John W. Yates,
　　　　　　　　By his Att'y, Patented Mar. 30, 1926.

1,579,189

UNITED STATES PATENT OFFICE.

JOHN W. YATES, OF NEW YORK, N. Y.

DRY-PIPE VALVE.

Application filed September 21, 1922. Serial No. 589,615.

*To all whom it may concern:*

Be it known that I, JOHN W. YATES, a citizen of the United States, residing in New York city, in the county of New York and State of New York, have invented certain new and useful Improvements in Dry-Pipe Valves, of which the following is a specification.

The present invention relates to dry pipe valves, and particularly to valves of this character for use in automatic sprinkler systems, and one object of the invention is to provide, a dry pipe valve which shall be relatively small, compact, simple in construction and operation and cheap to manufacture.

Another object is to provide a dry pipe valve in which the water valve and air valve members when moved to open position to permit flow into the valve body assume a position which of itself prevents return of these members to partially or fully closing position except by manual operation.

Another object is to provide a dry pipe valve in which the water valve and air valve members when moved to permit flow into the valve body are caused to fall by their own weight from a higher position to a lower position which prevents unintentional or accidental return of these parts to partially or fully closing position.

I accomplish these objects and such other objects as may appear in the following specification which is descriptive by way of example of one of the possible embodiments of the invention shown in the accompanying drawings in which Figure 1 is a vertical longitudinal sectional view of the dry pipe valve in closed position.

Figure 3, is a vertical longitudinal sectional view of the dry pipe valve showing the water valve and air valve members moved to open position and in position which prevents unintentional or accidental return of these members to partial or wholly closing position.

Figure 4, is a view of the exterior of the dry pipe valve looking in the direction of the arrow of Fig. 3.

Similar reference characters denote similar parts throughout the several views.

Amongst other advantages of the herein disclosed construction it is proposed as will be shown hereinafter to take advantage of the differential type of construction between the air valve and water valve whereby the air valve will be mounted in such a manner as to maintain, when in closed position only, a leverage action against the reaction of the water valve whereby the usual requirements of normal active pressure of 6 to 1 may be maintained.

The characteristic feature of my valve is that the air valve and water valve close the water way at each valve when seated, and the air valve is carried by a link arrangement mounted in the atmosphere chamber and outside of the air and water chambers, the valve member of the air valve constituting a lever which is fulcrumed at its lower end and with the axis of the air valve located at a greater distance from the fulcrum than is the axis of the waterway, so that thereby there will be a corresponding greater leverage through which the air pressure acts as compared with the leverage through which the water pressure acts. By this arrangement a leverage of approximately 2 to 1 between the air valve and water valve can be had, depending on the angle of the air valve seat relative to the angle of the water valve seat, thereby obviating the necessity of making the air valve six times the area of the water valve, as in my construction the area of the air valve seat need be approximately only three times the area of the water valve seat to provide the ratio of 6 to 1 required by the authorities. Furthermore this construction materially reduces the size of the valve body or housing by almost one-half.

A further feature is that when in closing position the air valve is arranged at an inclination to the line of axis of the water chamber and the water valve when in closing position is at a right angle to the line of axis of the water chamber.

At the instant of destruction of the leverage action by reason of dropping of the pressure in the air pipe system, and by reason of the lifting of the air valve, and upon the in-rush of water through the water valve into the air chamber the valve mechanism, owing to its weight and peculiar method of mounting, becomes overbalanced with the tendency to stay out of operative valve closing position and normally out of the path of the incoming fluid.

The invention comprises in its main parts or elements the housing 1, the air valve 2 and the water valve 3.

Figure 1:
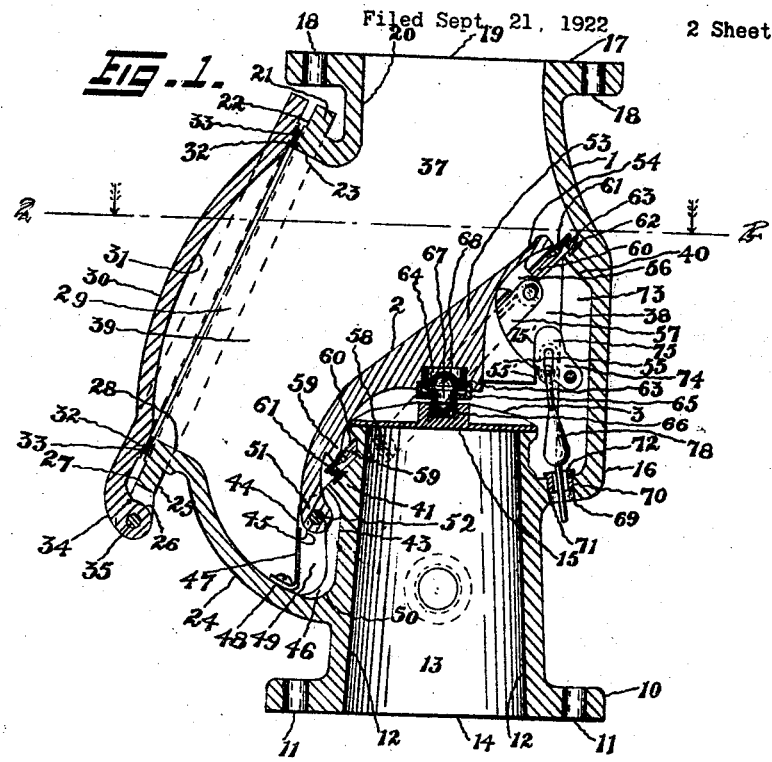

Referring to Fig. 1, the housing 1, which is cast of suitable metal, is provided with the flange portion or base 10 having the bolt holes 11 for attaching the housing by bolts, not shown, to a means, not shown, of water supply. The base 10 has extending therefrom the vertical walls 12 which form the water chamber 13 having the inlet 14 and outlet 15. The housing on one side thereof near the top of the water chamber 13 is extended outwardly and upwardly as at 16 and terminates in the flange portion or head 17 having the bolt holes 18 for attachment by bolts, not shown, of the housing to the sprinkler system also not shown, there being a communicating opening 19 in the head 17, directly opposed to the water outlet 15. The head 17 on the side opposite to the extension 16 has a short downward extension 20 which turns sharply outwardly and upwardly and forms an edge portion 21 of the housing having an outward face 22 and a downward face 23. The housing 1 at a point not quite midway of the length of the wall of the water chamber 13 on the side thereof opposite to the extension 16 is extended outwardly and upwardly as at 24 terminating in a downwardly extending edge portion 25 having at one end thereof the spaced apertured lugs 26, the edge portion 25 at its opposite end having an outward face 27 and an upward face 28, there being formed in the housing the circular opening 29 between the faces 23 and 24, shown in outline in Fig. 4, for which opening the cover 30 is provided.

The cover 30 has a concave interior portion 31 having inward edges or faces 32 which are engageable with a slightly raised portion on each of the faces 22 and 27 of the housing, there being a gasket 33 of rubber or other suitable material arranged between the faces 32 of the cover and the faces 22 and 27 of the housing for securing the cover to the housing in an air tight and water tight manner.

Figure 2:
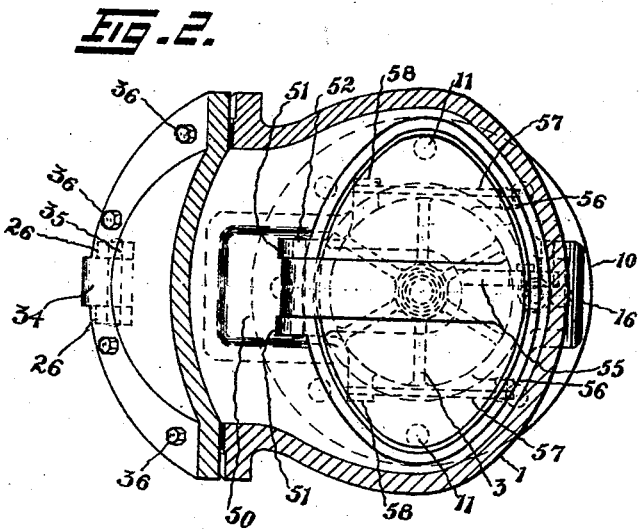
Figure 2, is a sectional view on the line 2—2 of Fig. 1, looking in the direction of the arrows of Fig. 1.

The cover 30 is provided with an outwardly extending bored lug or tail-piece 34 which is received between the apertured lug 26 and is retained therein by the cross pin 35, the cover thereby being pivotally connected to the housing and being securely held in covering position by bolts 36, Figs. 2 and 4, passing through the cover into the housing.

It will be noted that the housing 1 and cover 30 provide a valve case or enclosing means which has in its interior the chamber 37 constituting an air chamber provided on one side with small chambered extension 38 constituting an atmospheric chamber, having located therein parts of the device later described, the chamber 37 being provided on the other side with the larger chambered extension 39 for receiving therein the air valve 2 and water valve 3 when they are moved to open position.

The extension 16, at a point about midway of its vertical length, has formed on the interior of the housing a downwardly inclined shoulder 40, and the wall of the water chamber 13 on the side thereof opposite to the extension 16 has formed on the exterior of the wall near the top thereof the inclined shoulder 41, whereby an inclined ledge 42, shown in outline in Fig. 4, is provided, which extends around the interior of the housing from the shoulder 40 to the shoulder 41, the purpose of this ledge being later stated.

The spaced hooked or curve ended fulcrum members 43 are formed on the exterior of the wall of the water chamber 13 adjacent to the shoulder 41, the hooked heads 44 of these members being upward and having rear faces 45, the outer faces 45' of the bodies of the fulcrum members from the circular interiors of the heads to the lower ends of these members being substantially vertical, and the lower ends of these members merging by a gradual curve, as at 46, into the curve of the adjacent interior of the housing 1. The plate 47, which is removably attached to the interior bottom of the housing as by the screw 48, extends upwardly and across the space between the outer faces of the heads of the fulcrum members so as to form a chamber 49 between the fulcrum members and this plate, the purpose of the fulcrum members 43 and the plate 47 being later stated. Referring to Figs. 1 and 2, it will be noted that the large chambered extension 39 has at its bottom a substantially rectangular depressed portion 50, the purpose of which is also later stated.

The air valve member 2, when viewed from above is of circular shape, the circular shape substantially corresponding to the circular inclined ledge 42 of the housing, and this portion of the air valve member constituting a lever. The air valve member has adjacent to the fulcrum members 43 the apertured lugs 51 spaced apart from each other, these lugs being received between the fulcrum members 43 and held in operative relation thereto by the cross-pin 52 passing under the heads 44 of the fulcrum members and through the lugs 51.

The air valve member 2 on its inner or under side is extended, this extended portion when viewed in section, as in Figs. 1 and 3, having a substantially triangular mid portion 53 terminating in a thin edge portion 54, the mid portion 53 having on one side the smaller substantially triangular portion 55. The edge portion 54 has on its under or inner side the lugs 56 to which the links 57 are secured at one of their ends by pin and slot means, these links at their opposite ends being secured, as at 58, by pin and slot means to the outer sides of the water chamber 13. When the air valve member 2 is in closing position the links 57 act as lock levers for forcing or thrusting the cross-pin 52 against the inner faces 45 of the heads of the fulcrum members 43 the locking or restraining effect produced by this leverage being instantly broken or destroyed by upward or opening movement of the air valve member due to excess of water pressure over the air pressure by said links, and permitting movement of the air valve member by water pressure and its own weight to a position of second, or lower, support in the housing at the bottoms of the fulcrum members 43.

It will be noted that the less the distance from the centers of the heads of the fulcrum members 43 to the central vertical line of the water chamber 13, and the greater the distance from the centers of the heads of the fulcrum members 43 to the center of the air valve member 2, the less will be the required area of the air valve member in order to maintain the required pressure of 6 to 1 between the air and water valves common in practice.

The under side of the valve member 2 has secured to the thin edge portion 54 and to an under-side shoulder 59, by suitable means such as rivets or screws not conveniently shown in the views, but which may be readily understood, the flat metal ring 60, the flat ring 61 of rubber or other suitable resilient material, being clamped between the ring 60 and the thin edge portion 54 and shoulder 59 and providing the valve face for the air valve member 2. The inclined ledge formed by the shoulders 40 and 41 has suitably secured thereto, by means, as shown, of the extended portion 62 embedded in the inclined ledge, the flat ring 63 of soft metal, preferably lead, the flat ring 63 providing the valve seat for the rubber valve face ring 61.

The mid portion 53 of the air valve member has therein the recess 64, over which is secured, by threaded or other suitable means, the apertured cap 65. The water valve member 3 is circular in shape having a smooth under surface providing the valve face which is engageable with the valve seat formed by the upper edge of the water chamber 13. The water valve member 3 has in its upper surface the recess 66 oppositely disposed to the recess 64 of the air valve member, the lower end of the stud 67 being secured by threaded or other suitable means in the recess 66, the body of the stud extending through the aperture of the cap 65, and the stud being provided with an extended head 68 whereby the stud is prevented from being withdrawn from the cap, the water valve member 3 thus being loosely connected to the air valve member 2, and taking up any tilting or uneven movement of the air valve member on its flexible valve seat, and also permitting the water valve to engage properly and evenly with its seat.

Owing to the use of the links or levers 57 which are pivotally secured at their upper ends to the upper end of the air valve member, and have their lower ends located in the atmosphere chamber and pivoted slightly below the plane of the water valve and to one side of the center axis thereof, whereby upon said links or levers 57 reaching any intermediate vertical position, the weight of the valves coact to throw the air valve and water valve which depends therefrom into open or inoperative position and out of the way of the incoming stream so far back and below the water inlet as to make it impossible for the valves to reseat, thereby doing away with the interposition of any kind of valve lock or latch lock for positively maintaining the valves out of closing position, inasmuch as in their open or inoperative position, and due to their weight, the valves cannot move upwardly and fall forwardly upon their seats.

Due to the peculiar action of the cooperating levers 57 and the pin 52 in its sliding seat, denoted by 49, any movement of the air valve from off its seat, causes the pin 52 to be disengaged from the fulcrum members 43 and instantly to drop downwardly to the lower portion 46 of said members, thereby cooperating with the said levers 57 to throw the balance of the weight of both valves over and beyond the operative closed centers.

It will be noted that the distance from the point of engagement of the pin 52 with the curved ends of the fulcrum members 43 to the central point of the water seat is approximately one-half the length of the air seat, and the air valve being arranged at an inclination to the axial line of the water chamber and the water valve being arranged at a right angle to said axial line, that thereby a leverage of approximately 2 to 1 between the air valve and the water valve can be had.

By obviating the necessity of pivotal support on a common fixed center, for the air valve and water valve members, this construction permits of a pressure chamber of reduced size and reduces the casing proportions required to house the same, thereby reducing the entire bulk of the valve body.

The housing 1, at the bottom of the extension 16, has an aperture 69 therethrough in which is located the plug 70 having an aperture 71 through the bottom thereof, this aperture communicating with a recess or mouth 72 of the plug opening into the smaller chambered portion 38 of the housing, the plug 70 providing communication with the atmosphere and a drainage means for the interior of the housing. The small chambered portion 38 is provided with a side wall 73 to which the shifting plate 74 is pivotally secured. This plate has a nose 75 and an engaging notch 76, and has through it the slot 77.

The drain valve 78 has a pear-shaped body provided with an upper stem 79 Fig. 3 having a pin and head 80 which is slidable in the slot 77. The drain valve has a lower stem 81 passing loosely through the apertured plug 70, the lower end of the pear-shaped body of the valve being engageable in the recess or mouth 72 for closing the apertured plug by weight of this body. The engaging notch 76 of the plate 74 is engageable over the upper edge of the triangular portion 55 of the air valve member when the air valve member and water valve member are in closing position, Fig. 1, the pear-shaped body of the drain valve being maintained in raised position above the apertured plug 70, and permitting communication with the atmosphere through the plug. For facilitating movement to open position of the air valve and water valve members when the air valve and water valve members are first moved by the water pressure, the engaging notch 76 of the plate 74 is disengaged from the upper edge of the portion 55 of the air valve member, and the straight face 75' of the plate engages with camming action the adjacent straight face 55' of the portion 55, thereby tending to force the air valve member 2 upwardly, the plate 74 being held by the inclined position of the stem 81 in the apertured plug 70 until by upward movement of the air valve member the nose 75 of the plate engages the under side of the portion 53, as shown in outline in Fig. 3, and thereby prevents the air valve and water valve members falling back, due to a possible temporary lessening of the water pressure, into closing position and maintains them prepared for further movement to full opening position by later operative pressure of water, the body of the drain valve closing the apertured plug 70 and preventing escape thereby of water from the chamber 38.

In operation.

Removal of the cover portion 30 of the housing permits arrangement of the air valve and water valve members in position for preventing passage of air out of the air chamber 37 and closing the water passage from the chamber 13, the valve members being retained in this position by excess of air pressure on the air valve member 2 over water pressure on the water valve member 3. Upon reduction of the air pressure the valve members are raised by the water pressure, the pin 52 of the air valve member which is held by the links 57 in engagement with the inner faces 45 of the heads of the hooked members 43, is released from this engagement, the cross-pin sliding downwardly along the inner faces 45 and falling upon the curved lower ends 46 of the hooked members 43, the front faces 45' of the bodies of the hooked members acting as guide faces, the tail end portion of the air valve member 2 resting upon the bottom of the depressed space 49', being retained in the chamber or space 49 by the plate 47. The air valve and water valve members by their connection constituting a single valve structure, due to the pressure of water and movement of the links 57 are carried over into the inclined off center position adjacent to the cover 30, shown in Fig. 3 and are disposed outwardly relative to the axial line of the water chamber, and the links 57, having moved from the position shown in Fig. 1 to the position shown in Fig. 3, rigidly supporting or forming a prop for the air valve member and water valve member in this inclined lower position, this lower position and the links preventing movement of the air valve and water valve members to partially or wholly closing position by water hammer or back pressure or in any manner except by manual operation. It will be noted that when the air valve and water valve members are in this lower inclined position, direct and unobstructed passage of water is afforded between the water outlet 15 of the water chamber and the then water outlet 19 of the air chamber. In manually returning the valve members to closing position these members are guided by the links 57.

Having thus described my invention, it should be understood that there may be modifications thereof and variations therein without departing from the spirit of the invention or exceeding the scope of the appended claims.

What I claim and desire to protect by Letters Patent is:—

1. A dry pipe valve, comprising a housing forming an air pressure chamber and a second housing forming a water pressure chamber; an air valve for the air chamber and a water valve for the water chamber, the valves being connected to form a single valve structure, there being a fulcrum means on the exterior of the housing of the water pressure chamber, engaging the lower end portion of the valve structure when in closed position, and parallel links on the exterior wall of the water pressure chamber pivotally connected to the other end of the valve structure, the said fulcrum means co-operating with the links for maintaining the valve structure in closing position, when the pressure in the air chamber exceeds that in the water chamber; the co-operation of the links and the fulcrum being broken upon excess of pressure in the water chamber over the pressure in the air chamber and causing the valve structure to be moved to open position, the valve structure being guided by the links.

2. A dry pipe valve, comprising an air pressure chamber and a water pressure chamber, an air valve for the air chamber, and a water valve for the water chamber, the valves being connected to form a single valve structure and cooperating with upwardly presented seats to close communication between said chambers, fulcrum means on the exterior of said water pressure chamber, and link means pivotally connected to one end of the valve structure, the opposite end of the valve structure being engageable with said fulcrum means when the valve structure approaches its closed position, but disengaged therefrom when said valve structure is in full open position, the said link means and said fulcrum means coacting to lock the valve structure in closing position under normal air and water pressures in the two chambers, said valve structure being moved upwardly upon excess of water pressure over the air pressure whereby the locking coaction between the link means and the fulcrum means is broken and the valve structure urged to lower off-center position.

3. A dry pipe valve, comprising an air pressure chamber having an air valve seat, a water pressure chamber having a water valve seat, an air valve member engageable with the air valve seat, and a water valve member engageable with the water valve seat, said members being connected to form a single valve structure and cooperating with said seats to close communication between said chambers, fulcrum means on the exterior of said water pressure chamber, and link means pivotally connected to one end of the valve structure, the opposite end of the valve structure being engageable with said fulcrum means when the valve structure approaches its closed position, but disengaged therefrom when said valve structure is in full open position, the said link means and said fulcrum means coacting to lock the valve structure in closing position under normal air and water pressures in the two chambers, said valve structure being moved upwardly upon excess of water pressure over the air pressure whereby the locking coaction between the link means and the fulcrum means is broken and the valve structure urged to lower off-center position, said link means serving to guide the valve structure to off-center position.

4. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve and engageable with the seat of the water pressure chamber; links pivotally mounted at their lower ends below the upper end of the water pressure chamber and pivotally connected at their upper ends to the upper end of the air valve; and means engageable with the lower end of the air valve for providing a fulcrum for the air valve; the lower end of the air valve when said valve is in closing position being maintained in engagement with said fulcrum by the links.

5. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve and engageable with the seat of the water pressure chamber; links pivotally mounted at their lower ends below the upper end of the water pressure chamber and pivotally connected at their upper ends to the upper end of the air valve; and means engageable with the lower end of the air valve for providing a fulcrum for the air valve; the lower end of the air valve when said valve is in closing position being maintained in engagement with said fulcrum by the links and upon movement of the air valve to open position being disengaged from said fulcrum.

6. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve and engageable with the seat of the water pressure chamber; the air valve when in closing position being arranged at an inclination to the line of axis of the water pressure chamber and the water valve when in closing position being arranged at a right angle to the line of axis of the water pressure chamber; links pivotally mounted at their lower ends below the upper end of the water pressure chamber and pivotally connected at their upper ends to the upper end of the air valve; and means engageable with the lower end of the air valve for providing a fulcrum for the air valve; the distance from the center of said fulcrum to the center of the water valve being approximately one-half the distance from the center of said fulcrum to the center of the air valve; the lower end of the air valve when said valve is in closing position being maintained in engagement with said fulcrum by the links.

7. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve and engageable with the seat of the water pressure chamber; links pivotally connected at their lower ends on the exterior of the water pressure chamber below the upper end of said chamber and pivotally connected at their upper ends to the upper end of the air valve; and fulcrum means mounted on the exterior of the water pressure chamber below the points of pivotal connection of the lower ends of the links thereto and in alinement with said points of pivotal connection when the valves are closed; the lower end of the air valve when said valve is in closing position being maintained in engagement with said fulcrum means by the links and upon movement of the air valve to open position being disengaged from said means and the air valve and water valve being moved to an off-center position in the air pressure chamber and disposed therein to one side of the water pressure chamber; the air valve when the valves are so moved being disposed at an inclination outwardly relative to the line of axis of the water pressure chamber.

8. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve engageable with the seat of the water pressure chamber; the air valve when in closing position being arranged at an inclination to the line of axis of the water pressure chamber and the water valve when in closing position being arranged at a right angle to the line of axis of the water pressure chamber; links pivotally mounted at their lower ends on the exterior of the water pressure chamber below the upper end of said chamber and pivotally connected at their upper ends to the upper end of the air valve; and fulcrum means mounted on the exterior of the water pressure chamber below the points of pivotal connection of the lower ends of the links thereto and in alinement with said points of pivotal connection when the valves are closed; the distance from the center of said fulcrum means to the center of the water valve being approximately one-half the distance from the center of said fulcrum means to the center of the air valve; the lower end of the air valve when said valve is in closing position being maintained in engagement with said fulcrum means by the links and upon movement of the air valve to open position being disengaged from said means and the air valve and water valve being moved to an off-center position in the air pressure chamber and disposed therein to one side of the water pressure chamber; the air valve when the valves are so moved being disposed at an inclination outwardly relative to the line of axis of the water pressure chamber.

9. A dry pipe valve comprising, an air pressure chamber and a water pressure chamber; a valve seat in the air pressure chamber and a valve seat in the water pressure chamber; an air valve engageable with the seat of the air pressure chamber and a water valve carried by the air valve and engageable with the seat of the water pressure chamber; links pivotally mounted at their lower ends on the exterior of the water pressure chamber below the upper end of said chamber and pivotally connected at their upper ends to the upper end of the air valve; fulcrum members having hooked heads and mounted on the exterior of the water pressure chamber below the points of pivotal connection of the lower ends of the links thereto and said heads being in alinement with said points of pivotal connection when the valves are closed; the lower end of the air valve when in closing position being maintained in engagement with the heads of the fulcrum members by the links and upon movement of the air valve to open position being disengaged from said heads; and an upstanding plate cooperating with said members for limiting the movement of the lower end of the air valve to the space comprised between said members and the plate.

10. A dry pipe valve comprising, an air pressure chamber and a water pressure chamber; an air valve and a water valve carried by the air valve; the air valve when in closing position being arranged at an inclination to the line of axis of the water pressure chamber and the water valve when in closing position being arranged at a right angle to the line of axis of the water pressure chamber; links pivotally mounted at their lower ends below the upper end of the water pressure chamber and pivotally connected at their upper ends to the lower end of the air valve; and means for providing a fulcrum located below the pivotal point of the lower ends of the links and in alinement with said pivotal point when the valves are closed; the distance from the center of said fulcrum to the center of the water valve being approximately one-half the distance from the center of the said fulcrum to the center of the air valve; the lower end of the air valve when the valve is in closing position being in engagement with said fulcrum and being maintained in engagement therewith by the links, and upon movement of the air valve to open position being disengaged from said fulcrum.

11. A dry pipe valve comprising, an air pressure chamber and a water pressure chamber; an air valve and a water valve carried by the air valve; the air valve when in closing position being arranged at an inclination to the line of axis of the water chamber and the water valve when in closing position being arranged at a right angle to the line of axis of the water pressure chamber; links pivotally mounted at their lower ends on the exterior of the water pressure chamber and below the upper end thereof and pivotally connected at their upper ends to the lower end of the air valve; and fulcrum members secured on the exterior of the water pressure chamber below the point of pivotal connection of the lower ends of the links, and in alinement with said pivotal point when the valves are closed; the distance from the center of the heads of the fulcrum members to the center of the water valve being approximately one-half the distance from the center of said heads to the center of the air valve; the lower end of the air valve when the valve is in closing position being in engagement with the heads of said members and being maintained in engagement therewith by the links and upon movement of the air valve to open position being disengaged from the heads of said members.

JOHN W. YATES.